United States Patent Office 3,474,121
Patented Oct. 21, 1969

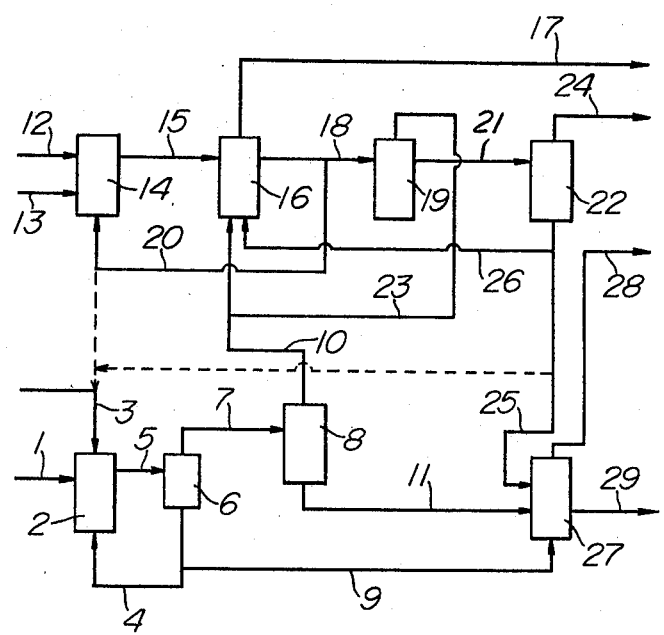

3,474,121
PROCESS FOR PRODUCING ISOBUTENE AND TRIALKYLALUMINUM OF WHICH THE ALKYL IS PRINCIPALLY 2-ETHYLHEXYL GROUP
Ryoma Tanaka, Kiyoshi Toyoshima, and Eiichi Ichiki, Niihama-shi, Japan, assignors to Sumitomo Chemical Company, Ltd., Higashi-ku, Osaka, Japan, a corporation of Japan
Filed June 7, 1966, Ser. No. 555,747
Int. Cl. C07f 5/06
U.S. Cl. 260—448          14 Claims

ABSTRACT OF THE DISCLOSURE

Isobutene is separated from a butane-butene fraction containing 1-butene and isobutene by heating the fraction in the presence of an alkylaluminum compound catalyst to dimerize 1-butene to 2-ethyl-1-hexene, 2-ethyl-1-hexene separated from the residual mixture is reacted with isobutylaluminum compound to obtain tri-2-ethylhexylaluminum, and isobutene contained in the residual fraction from said dimerization reaction is treated with diisobutylaluminum hydride to produce triisobutylaluminum, which is then heated to decompose it into diisobutyl aluminum hydride and isobutene and recover that isobutene therefrom.

---

The present invention relates to a process for producing isobutene and trialkylaluminium whose alkyl is principally 2-ethylhexyl group and more particularly it relates to a process for producing highly pure isobutene as well as trialkylaluminium whose alkyl is principally 2-ethylhexyl group from hydrocarbon mixture composed of butane-butene, containing 1-butene and isobutene.

The present invention in the principal embodiment is that, first, said hydrocarbon mixture is heated in the presence of an alkylaluminium to convert 1-butene, one of the components of the mixture, into an octene mixture containing principally 2-ethyl-1-hexene and the octene mixture is separated from the unreacted butane-butene hydrocarbon mixture; second, the octene mixture containing principally 2-ethyl-1-hexene, which has been obtained from the first step, is reacted with isobutylaluminium compounds to produce isobutene and trialkylaluminium whose alkyl is principally 2-ethyl-1-hexyl, and if desired, third, the unreacted butane-butene hydrocarbon mixture separated from the first step is reacted with diisobutylaluminium hydride to convert isobutene into triisobutylaluminium, then, triisobutylaluminium is separated from the residual butane-butene hydrocarbon mixture and heated to obtain diisobutylaluminium hydride and isobutene. Thereby trialkylaluminium, whose alkyl is mainly 2-ethylhexyl group, as well as highly pure isobutene is produced.

Hitherto, it has been well known that refined 1-butene is dimerized in the presence of a catalyst of tributylaluminium to produce 2-ethyl-1-hexene. However, it was not certain whether, by use of catalytic amount of trialkylaluminium, octene mixture is obtained from butane-butene mixture (hereinafter, this is referred to as C$_4$ fraction), containing isobutene and 1-butene, and how the other butenes than 1-butene participate in the above reaction. Furthermore, it is well known that trioctylaluminium was produced by means of a displacement reaction of triisobutylaluminium and octene (hereinafter this is merely referred to as a displacement reaction) or trioctylaluminium was directly synthesized by a reaction of aluminium, hydrogen and octene. However, hitherto, there has not been known a process for producing trialkylaluminium which contains substantially tri(2-ethylhexyl)aluminium from butane-butene hydrocarbon mixture containing 1-butene.

1-butene and isobutene exist mainly in the form of a mixture of n-butane, isobutane, 2-butene, butadiene and so on having four carbon atoms in the fraction of the by-product hydrocarbon, the said fraction being produced in a process of producing ethylene and propene by means of cracking thermally petroleum naphtha or in a process of refining petroleum. In order to utilize effectively the said products as raw materials of chemical industries, those components shall be separated and refined respectively. Usually, 1-butene and isobutene can be separated by distillation and refined by use of extraction agents such as sulfuric acid and others. The refining operation involves numerous difficult points, from a technical viewpoint and expensive. Consequently, it is not economical to use the separated and refined one.

One object of the present invention is to provide an improved and economical process for directly producing trialkylaluminium having principally 2-ethylhexyl group for the alkyl group from C$_4$ fraction containing 1-butene and isobutene taking advantage of reaction selectivity of 1-butene to alkylaluminium catalyst, without separating and refining 1-butene. Another object of the present invention is to provide a process for producing highly pure isobutene from butane-butene mixture.

Other objects and advantages will be apparent from the following descriptions and examples.

The present inventors have discovered that trialkylaluminium substantially consisting of tri(2-ethylhexyl) aluminium can be obtained when a series of the following reaction is conducted under proper conditions, wherein butane-butene hydrocarbon mixture, without separating into the respective components, is treated directly in the presence of alkylaluminium compounds as a catalyst, thereby 1-butene alone is converted into an octene mixture containing 2-ethyl-1-hexene as a principal component, and the octene mixture is separated from the other unreacted butane-butene hydrocarbon mixture consisting of n-butane, isobutane, 2-butene and isobutene and then allowed to cause a displacement reaction with isobutylaluminium compounds selected from triisobutylaluminium, diisobutylaluminium hydride and a mixture thereof. The present inventors have also discovered that when the unreacted butane-butene hydrocarbon mixture separated from the octene mixture is reacted with diisobutylaluminium hydride to convert isobutene into triisobutylaluminium; 2-butene does not substantially participate in the reaction. Moreover, taking isobutene off in the form of triisobutyl aluminium is advantageous in that all isobutene can completely be separated, despite of isobutene content in the C$_4$ fraction and, the triisobutylaluminium produced can be changed into diisobutylaluminium hydride and pure isobutylene by decomposition by heating, whereby a high purity of isobutene can be separated very easily. By combining this separation process of isobutene with the above described production process of tri(2-ethylhexyl)-aluminium, the process of the present invention is much effectively conducted. Furthermore, a high purity of isobutene can be separated in the process of displacement reaction between a mixture of isobutylaluminium compounds and octene.

The residual butane-butene hydrocarbon mixture which comes from treating the unreacted butane-butene hydrocarbon mixture (which is obtained in the first step) with diisobutylaluminium hydride in the third step, consists mainly of n-butane, isobutane and 2-butene. If the residual butane-butene hydrocarbon mixture is converted again into the hydrocarbon mixture containing isobutene and 1-butene by use of dehydrogenation-isomerization reaction and then recycled to the first step, the all C$_4$ fraction components can be changed into trialkylaluminium comprising mainly 2-ethylhexyl group for the alkyl group as well as isobutene.

Trialkylaluminium obtained in the present invention is substantially the aforesaid tri(2-ethylhexyl)-aluminium and a formation of trialkylaluminium whose alkyl has four carbon atoms in one molecule or eight carbon atoms in one molecule except 2-ethylhexyl group is in very small amount. Aliphatic primary alcohol of eight carbon atoms mainly consisting of 2-ethylhexanol is readily obtained if the trialkylaluminium is subjected to oxidation-hydrolysis treatment. Said aliphatic primary alcohol is familiar as and useful for a raw material for plasticizers of polyvinyl chloride and other vinyl polymers. Isobutene of high purity obtained by the present invention is useful for the starting material which has a great utility in petrochemical synthesis and more specifically, this is used as a material for the generation of methyl methacrylate, butyl rubber, triisobutylaluminium and so on.

One embodiment of the present invention is explained hereunder referring to the accompanying flow diagram. However, it is not intended to limit the process of the present invention to the diagram. It is desirable that the butadiene content of $C_4$ fraction in the present invention shall be one percent or less by weight. When butadiene is in excess, a component which has a high boiling point and twelve carbon atoms or more in one molecule is easily produced. Contents of 1-butene and isobutene which are indispensable are not critical theoretically, but desirably 10 percent or more by weight, respectively.

If the contents are below 10%, larger equipment is required and an unfavorable result is brought on the productivity. Generally, $C_4$ fraction used in the present invention is obtained by removing butadiene from the by-product $C_4$ hydrocarbon fraction which is produced in a process of producing ethylene and propene by means of cracking thermally petroleum naphtha or in a process of refining petroleum. Said $C_4$ fraction comprises mainly a mixture of n-butane, isobutane, isobutene, 1-butene and 2-butene. Usually the contents of butadiene, 1-butene and isobutene satisfy the above conditions. Water in the $C_4$ fraction is not desirable because it reacts with alkylaluminium compounds as a catalyst to make it waste, so that it is desirable as little as possible.

In the drawing, a $C_4$ fraction is charged in a reactor of dimerization 2 from a line 1, and is mixed with alkylaluminium compounds as a catalyst fed from 3 and 4. The resultant mixture is allowed to react at the temperature of 130° C. to 220° C., preferably 160° to 190° C. and under the pressure of 5 to 100 kg./cm.$^2$, preferably 20 to 80 kg./cm.$^2$.

As to temperature range, if it is higher than 190° C., some aluminium and aluminium carbide is produced from thermal cracking of alkylaluminium compounds as a catalyst, in the reaction, and if it is below 160° C., the rate of dimerization is deteriorated. The kinds of alkylaluminium compounds are not specifically critical, but preferably triisobutylaluminium, diisobutylaluminium hydride, trialkylaluminium or dialkylaluminium hydrides whose alkyl is n-butyl, 2-ethyl-hexyl or other octyl groups or mixtures thereof. These catalysts can be regenerated and reused.

These catalysts are added in the $C_4$ fraction in such ratio as a molar number of 1-butene in the raw material to a molar number of alkylaluminium compounds is from 5:1 to 50:1.

Residence time in the reactor of dimerization 2 is remarkably variable dependent upon a reaction temperature and a concentration of the catalyst and it is desirable that the reaction is carried out until 1-butene is not found in the products after termination of the reaction. The reaction product from the reactor of dimerization 2, after passing through a line 5 is fed in a stripper 6, and a non-reacted butane-butene mixture and major amount of octene mixture produced in the dimerization are separated from the catalyst in a temperature of 120° C. to 180° C. and are fed in a distillation tower 8 after passing through a line 7.

The catalyst separated at the stripper 6 passes through the line 4 and the main parts of the catalyst are returned back in the reactor of dimerization.

One part of the catalyst, however, after passing through a line 9, is fed into a reactor of displacement 27, in order that unfavorable difficult volatile substances may be controlled from accumulation. It is considered that such an accumulation of difficult volatile substances is produced due to a reaction between a little amount of water in the raw materials and alkylaluminium compounds. Taking this into account, alkylaluminium compounds as a catalyst, should be further supplied as it is diminished. To this effect, triisobutylaluminium and diisobutylaluminium hydride or a mixture thereof which is obtained in the later step may be fed passing through the line 3.

Isobutene, 2-butene and butane mixture are separated at the top of a distillation tower 8, and are conveyed in an alkylation reactor 16, after passing through a line 10. A component of higher boiling point which contains octene mixture as a principal component is separated at the bottom of the said distillation tower 8 and is conveyed in the said reactor of displacement 27, after passing through a line 11.

In the reactor of displacement 27, octenes containing a main component of 2-ethyl-1-hexene from a line 11 and diisobutylaluminum hydride from a line 25 and if necessary, a small amount of the catalyst exhausted from the line 9 are mixed together, and the resultant mixture is allowed to conduct displacement reaction under reflux at a temperature of 80° to 170° C. and under the atmospheric pressure to the reduced pressure, and there can be produced trialkylaluminum comprising principally 2-ethyl-hexyl group for the alkyl group and isobutene.

In the aforesaid reaction, triisobutylaluminum together with or without diisobutylaluminum hydride from the other lines can be employed instead of diisobutylaluminum hydride from a line 25.

The displacement reaction can be effected in the absence of a solvent. However, a solvent which is inert to the alkylaluminum compounds and is feasibly boiled under the reaction condition, particularly a solvent which has a boiling point below 130° C. to keep the reaction system under reflux, may be used, whereby the aimed trialkylaluminum can be produced in high yield. Simultaneously, isobutene produced is easily exhausted under reflux and a time for terminating the reaction can be shortened. The solvent includes saturated aliphatic hydrocarbons and aromatic hydrocarbons, i.e., octane, heptane, hexane, pentane, cyclohexane, benzene and toluene. Out of the solvents, it is most convenient to use the octane which contains isomer and is produced in small amount as a by-product of the present invention.

Isobutene exhausted from the displacement reaction is accompanied with a very small amount of octene mixture and solvents. Said octene mixture and solvents are separated from said isobutene and returned back in the reactor of displacement 27. A high purity of isobutene can be produced from a line 28. On the other hand, trialkylaluminum obtained from the line 29, after termination of the displacement reaction, consists mainly of (2-ethylhexyl)aluminum, and little of the other trialkylaluminum. In case a solvent is used in the displacement reaction, trialkylaluminum obtained from the line 29 contains a solvent and, if necessary, it may be heated below 60° C. under reduced pressure to distill the solvent off. In some case, the solvent may not be removed. It is not desirable to heat alkylaluminum in excess to 60° C., because it results in an elimination of octenes from the said alkylaluminum compounds.

Diisobutylaluminum hydride fed from a line 15 or diisobutylaluminum hydride fed from a line 26 is allowed to react with the unreacted butane-butene hydrocarbon mixture fed from the line 10 in the reactor of alkylation 16, thereby isobutene in the butane-butene mixture is allowed to cause an addition-reaction with the diisobutylaluminum hydride until it is converted into triisobutylaluminum. The alkylation is effected at a temperature of 50° C. to 120° C. and under a pressure of the atmospheric pressure to 15 kg./cm.² and at a ratio of moles of isobutene to moles of diisobutylaluminum hydride (0.5:1 to 1.5:1).

The diisobutylaluminum hydride employed in the line 15 is synthesized in a reactor of producing butylaluminum compounds 14 in a common process, namely aluminum or aluminum alloy fed from a line 12, hydrogen from a line 13 and triisobutylaluminum from a line 20 are allowed to react in the reactor 14 at a temperature of 100° C. to 160° C. and under hydrogen partial pressure of 30 kg./cm.² to 150 kg./cm.². The diisobutylaluminum hydride synthesized as aforementioned usually contains unreacted triisobutylaluminum which is not harmful and is not necessary to be removed.

Residual butane-butene hydrocarbon mixture in the alkylation reactor 16 is exhausted from a line 17. The exhausted gas is mainly composed of n-butane, isobutane and 2-butene, wherein 1-butene is absolutely null or little if any. Triisobutylaluminum produced in the reactor of alkylation 16, which may or may not contain unreacted diisobutylaluminum hydride, is fed into a degasser 19 after passing through a line 18 and is kept at a slightly higher temperature than the temperature of alkylation, whereby 2-butene and butane mixture dissolved therein are separated. Those separated compounds which may contain unreacted isobutene are recycled to the reactor of alkylation 16 through lines 23 and 10.

One part of the triisobutylaluminum passes through a line 20 from a midway of the line 18 and is recycled to the reactor of producing butylaluminum compounds 14, but the said part may pass through the line 3 and may be fed into the reactor of dimerization 2 as a catalyst.

Then, triisobutylaluminum obtained in the degasser 19, which may contain unreacted diisobutylaluminum hydride, is fed to a reactor of eliminating isobutene 22 from a line 21, whereby the triisobutylaluminum is converted into diisobutylaluminum hydride and isobutene under atmospheric or reduced pressure and at a temperature of 100° C. to 200° C., preferably 130° C. to 190° C. The isobutene is taken out through a line 24 and the diisobutylaluminum hydride is conveyed into a reactor of displacement 27 through a line 25. On the other hand, the diisobutylaluminum hydride in the surplus may be returned to the reactor of alkylation 16 from a line 26 and one part thereof may be replenished in the reactor of dimerization 2 as a catalyst, after passing through a line 3.

In accordance with said process, isobutene is produced in very high purity and isobutene in 95 percent or more of purity can be easily produced by removing fully a contamination or dissolved butane mixture in the degasser 19.

The present process may be effected batchwise or continuously.

The following examples are shown in batchwise, however, it is not intended to limit the invention to batch process.

EXAMPLE

As the first step, $C_4$ fraction shown in Table 1 was charged in a one litre autoclave and as a catalyst, 0.015 mole of diisobutylaluminium hydride and 0.095 mole of triisobutylaluminium were added in the autoclave and the resulting mixture was heated and agitated for 16 hours under a pressure of 50 kg./cm.² and at a temperature of 175° C. to 180° C. Then, the pressure inside the reaction system was reduced to 41 kg./cm.² and after termination of reaction, unreacted butane-butene mixture was separated from the reaction product and the compositions were obtained as shown in Table 2.

Furthermore, the liquid product was heated at 180° C. and volatile components were separated therefrom under a reduced pressure and 38.6 g. of a fraction were obtained at a distilling temperature of 115° C. to 122° C.

The said fraction was analyzed to show that olefin hydrocarbon which contains 2-ethyl-1-hexene as a main component and has eight carbon atoms and a residual fraction was alkylaluminium compounds, which has an average composition of $(C_8H_{17})_{0.51}(C_4H_9)_{1.73}AlH_{0.76}$.

Table 1

| Components: | Unit (mole) |
| --- | --- |
| Propylene | 0.02 |
| 1-butene | 1.18 |
| 2-butene | 0.38 |
| Isobutene | 1.21 |
| Butadiene | 0.01 |
| Butanes | 1.22 |

Table 2

| Components: | Unit (mole) |
| --- | --- |
| Propylene | 0 |
| 1-butene | 0.04 |
| 2-butene | 0.48 |
| Isobutene | 1.21 |
| Butadiene | 0 |
| Butanes | 1.20 |

On the other hand, a 500 cc. three-necked flask equipped with an agitator was used for the second step, wherein 70.6 g. of the entirely equal substance or olefin hydrocarbon obtained in the first step (comprising a main component of 2-ethyl-1-hexene and eight carbon atoms in it) and 0.18 mole of diisobutylaluminium hydride and 0.02 mole of triisobutylaluminium obtained in the following third step were mixed together with and the resultant mixture, in presence of 70 g. of saturated hydrocarbon containing eight carbon atoms were heated under reflux and at atmospheric pressure and thereby isobutene was exhausted and according as the temperature was raised gradually from 100° C. to 130° C., the reflux alone was noticeable, but no more isobutene was exhausted therefrom. The above reaction required approximate 5 hours and 22.6 g. of isobutene were recovered.

The liquid product consisted of a saturated hydrocarbon which comprises eight carbon atoms and was used for the solvent and a trioctylaluminium which comprises mainly 2-ethyl hexyl group for alkyl group, and a temperature of liquid product was gradually raised under a reduced pressure of 5 mm. Hg to eliminate the solvent and it was retained at 50° C. for 2 hours.

The distilled product during the said hours was cooled and collected and 71.3 g. of a liquid product were obtained. This distilled product was almost a saturated hydrocarbon comprising eight carbon atoms. The residue amounted to 72.4 g. and was analyzed and identified as trioctylaluminium comprising mainly 2-ethyl hexyl group for alkyl group.

As the third step, an exhausted gas of butane-butene mixture such as the composition in Table 2 and a mixture of 1.2 mole of diisobutylaluminium hydride and 0.11 mole of triisobutylaluminium were charged in an autoclave, wherein the resultant mixture was heated and agitated at 90° C. for one hour and isobutene in the exhausted gas was allowed to cause an addition-reaction with diisobutylaluminium hydride and the reaction product was cooled and agitated at 40° C. to separate unreacted gas therefrom and then butane-butene mixture was separated in the amount as indicated in Table 3 for "Exhausted gas at 40° C. or less."

Furthermore, a temperature of the said reaction product was raised gradually from 40° C. to 130° C. to separate unreacted gas dissolved in the reaction product, whereby the butane-butene mixture was separated in the amount as indicated in Table 3 for "Exhausted gas in the range of 40° C. to 130° C."

Continuously, a temperature of the said reaction product was raised from 130° C. to 190° C. and thereby the 96% purity of isobutene was obtained in the amount as indicated in Table 3 for "Exhausted gas in the range of 130° C. to 190° C."

The liquid residue contained 1.16 moles of diisobutyl-aluminium hydride and 0.13 mole of triisobutylaluminium.

TABLE 3

[Unit:Mole]

| | Exhausted gas at 40° C. or less | Exhausted gas in the range of 40° C. to 130° C. | Exhausted gas in the range of 130° C. to 197° C. |
|---|---|---|---|
| 2-butene | 0.26 | 0.15 | 0.02 |
| Isobutene | 0.116 | 0.338 | 0.732 |
| Butanes | 0.70 | 0.46 | 0.01 |

Alkylaluminium compounds in an average composition of $(C_8H_{17})_{0.51}(C_4H_9)_{1.73}AlH_{0.760}$, which was initially obtained in the above process can be re-used in the first step as a catalyst. But a decomposed product which was produced by aqueous component mixed in $C_4$ fraction of raw material and a small amount of tri(2,2-dimethyl-hexyl)-aluminium which was produced as a by-product in the reaction of tri(n-butyl)aluminium with isobutene are both undesirable for a catalyst and are hardly volatile substances. In order to control these undesirable substances from accumulation, the one part is fed in a displacement reaction and is admixed with an equal mole of trialkyl aluminium, and dialkylaluminium hydride or these mixtures and it is desirable to re-use the above admixture.

An exhausted gas in the range of 40° C. to 130° C. on the third process contains a high amount of isobutene, so that it is again mixed with a mixed gas of butane-butene obtained in the first step and this mixed gas is recycle.

For next, a necessary amount alone of diisobutylaluminium hydride and triisobutylaluminium, as apparent in the example is fed in the second step, but it is a matter of course that the residue of them, if produced, can be recycled to the third step.

What is claimed is:

1. A method for producing trialkylaluminum whose alkyl is principally 2-ethylhexyl group, which comprises a first step wherein a butane-butene hydrocarbon mixture containing 1-butene and isobutene is heated in the presence of a catalyst of an alkylaluminum compound, the molar ratio of 1-butene to alkylaluminum compound being from 5:1 to 50:1, at temperature of 130° C. to 220° C. and under pressure of 5 to 100 kg./cm.$^2$, until the 1-butene is converted into octene mixture composed mainly of 2-ethyl-1-hexene, separating the octene mixture from the unreacted butane-butene hydrocarbon mixture; and a second step wherein the octene mixture composed mainly of 2-ethyl-1-hexene is reacted with an isobutylaluminum compound at a temperature of 80° C. to 170° C. under reflux to form trialkylaluminum whose alkyl is pricipally 2-ethyl-hexyl group, and recovering the said trialkylaluminum compound.

2. A method according to claim 1, wherein the butane-butene hydrocarbon mixture in the first step contains 10 percent or more by weight of 1-butene and isobutene, respectively, and one percent or less by weight of butadiene.

3. A method according to claim 1, wherein the alkylaluminum compound catalyst in the first step is selected from trialkylaluminum and dialkylaluminum hydride wherein the alkyl is an isobutyl, n-butyl or octyl group.

4. A method according to claim 1, wherein the second step is conducted in the presence of inert hydrocarbon solvents having a boiling point below 130° C.

5. A method according to claim 4, wherein the inert hydrocarbon solvent is octane, heptane, hexane, pentane, cyclohexane, benzene, toluene or mixtures thereof.

6. A method according to claim 1, wherein the isobutylaluminum compound in the second step is triisobutylaluminum, diisobutylaluminum hydride or a mixture thereof.

7. A method for producing isobutene and a trialkylaluminum whose alkyl is principally 2-ethylhexyl group, which comprises as a first step heating a butane-butene hydrocarbon mixture containing 1-butene and isobutene in the presence of a catalyst of alkylaluminum compound, the molar ratio of 1-butene to alkylaluminum compound being from 5:1 to 50:1, at a temperature of 130° C. to 220° C. and under pressure of 5 to 100 kg./cm.$^2$, until the 1-butene is converted into an octene mixture composed principally of 2-ethyl-1-hexene and separating the octene mixture from the unreacted butane-butene hydrocarbon mixture and as a second step reacting the octene mixture containing 2-ethyl-1-hexene as a main component with an isobutylaluminum compound at a temperature of 80° C. to 170° C. under reflux to form trialklaluminum whose alkyl is principally 2-ethylhexyl group; and as a third step reacting the butane-butene hydrocarbon mixture separated in the first step with diisobutylaluminum hydride to convert isobutene in the said hydrocarbon into triisobutylaluminum separating the said triisobutylaluminum from the butene mixture and then decomposing said trialkylaluminum by heating to produce diisobutylaluminum hydride and isobutene.

8. A method according to claim 7, wherein the butane-butene hydrocarbon mixture in the first step contains 10 percent or more by weight of 1-butene and isobutene, respectively, and one percent or less by weight of butadiene.

9. A method according to claim 7, wherein the alkylaluminum compound as a catalyst in the first step is selected from trialkylaluminum and dialkylaluminum hydride whose alkyl is isobutyl, n-butyl or octyl group.

10. A method according to claim 7, wherein the second step is conducted in the presence of inert hydrocarbon solvents having a boiling point below 130° C.

11. A method according to claim 10, wherein the inert hydrocarbon solvent is octane, heptane, hexane, pentane, cyclohexane, benzene, toluene or mixture thereof.

12. A method according to claim 7, where in the isobutylaluminum compound in the second step is triisobutylaluminum, diisobutylaluminum hydride or mixtures thereof.

13. A method according to claim 7, wherein the isobutylaluminum compound used in the second step is recycled from the third step.

14. A method according to claim 7 wherein the diisobutylaluminum hydride used in the third step is produced by reacting a part of the triisobutylaluminum from the third step with hydrogen and aluminum metal or an alloy thereof.

References Cited

UNITED STATES PATENTS

| | | |
|---|---|---|
| 2,695,327 | 11/1954 | Ziegler et al. |
| 2,826,598 | 3/1958 | Ziegler et al. |
| 2,835,689 | 5/1958 | Ziegler et al. |
| 3,004,087 | 10/1961 | Goddard et al. |
| 3,015,669 | 1/1962 | Ziegler et al. |
| 3,207,770 | 7/1965 | Ziegler et al. |
| 3,268,569 | 8/1966 | Mulder et al. |
| 3,347,894 | 10/1967 | Trebillon et al. |

OTHER REFERENCES

Liebigs Ann. Der Chemie, vol. 629, pp. 8, 11, 17, 18, 162 and 212 (1960).

TOBIAS E. LEVOW, Primary Examiner

H. M. S. SNEED, Assistant Examiner